(12) United States Patent
Ishida et al.

(10) Patent No.: US 7,500,414 B2
(45) Date of Patent: Mar. 10, 2009

(54) STEERING COLUMN DEVICE FOR VEHICLE

(75) Inventors: Ryuuichi Ishida, Gunma-ken (JP); Shin Yoshimoto, Gunma-ken (JP); Toshimichi Takano, Gunma-ken (JP)

(73) Assignee: NSK Ltd., Tokyo (JP)

( * ) Notice: Subject to any disclaimer, the term of this patent is extended or adjusted under 35 U.S.C. 154(b) by 847 days.

(21) Appl. No.: 10/512,471

(22) PCT Filed: Jun. 2, 2003

(86) PCT No.: PCT/JP03/06925

§ 371 (c)(1),
(2), (4) Date: Oct. 26, 2004

(87) PCT Pub. No.: WO03/101807

PCT Pub. Date: Dec. 11, 2003

(65) Prior Publication Data

US 2005/0166700 A1    Aug. 4, 2005

(30) Foreign Application Priority Data

Jun. 4, 2002    (JP) .............................. 2002-163175

(51) Int. Cl.
*B62D 1/18* (2006.01)
(52) U.S. Cl. ........................................ 74/493; 280/775
(58) Field of Classification Search ................. 74/493; 280/775
See application file for complete search history.

(56) References Cited

U.S. PATENT DOCUMENTS 4,648,624 A * 3/1987 Mouhot et al. .............. 280/775

(Continued)

FOREIGN PATENT DOCUMENTS

DE    4016163 A1    11/1991

(Continued)

OTHER PUBLICATIONS

U.S. Appl. No. 10/512,563, filed Oct. 25, 2004 (corresponds to Cite No. 1).

(Continued)

*Primary Examiner*—William C Joyce
(74) *Attorney, Agent, or Firm*—Miles & Stockbridge P.C.

(57) ABSTRACT

In a tilt and/or telescopic type steering column apparatus for a vehicle, in which a column sided bracket attached to a steering column is so provided as to be swingable and/or slidable on a car body sided bracket attached to a car body, a fastening bolt is inserted through a tilt adjustment hole formed in the car body sided bracket and through a telescopic adjustment hole formed in the column sided bracket, the two brackets are pressure-contacted to each other by fastening the fastening bolt and thus fastened in a tilt and/or telescopic adjustment position, while a tilt and/or telescopic adjustment can be made by releasing the two brackets from being pressure-contacted by slackening the fastening bolt, and each of the tilt adjustment hole and the telescopic adjustment hole has a slight gap with respect to the fastening bolt, a steering column apparatus for a vehicle is constructed such that an annular or cylindrical elastic member for preventing a backlash of the fastening bolt from being caused corresponding to the slight gap when making the tilt and/or telescopic adjustment, is fitted on an outer peripheral surface of the fastening bolt.

5 Claims, 4 Drawing Sheets

U.S. PATENT DOCUMENTS

| | | | | |
|---|---|---|---|---|
| 5,596,907 | A | 1/1997 | Barton | 74/493 |
| 5,787,759 | A * | 8/1998 | Olgren | 74/493 |
| 2005/0225068 | A1 | 10/2005 | Ishida et al. | |

FOREIGN PATENT DOCUMENTS

| | | |
|---|---|---|
| EP | 0834438 A1 | 4/1998 |
| GB | 2113629 A | 8/1983 |
| JP | 55-51664 A | 4/1980 |
| JP | 60-98571 | 7/1985 |
| JP | 62-64679 | 4/1987 |

OTHER PUBLICATIONS

Partial English translation of JP 60-98571.
Partial English translation of JP 62-64679.

* cited by examiner

STEERING COLUMN DEVICE FOR VEHICLE

TECHNICAL FIELD

The present invention relates to a steering column apparatus for a vehicle, which is capable of smoothly moving a fastening bolt and preventing emission of butting noises while keeping a tilt and/or telescopic adjustment operation preferable.

BACKGROUND ART

For example, in a tilt and/or telescopic type steering column apparatus for a vehicle, a steering column is so constructed as to be tiltable and telescopically slidable, and a column sided bracket (distance bracket) attached to the steering column can be pressure-contacted to a car body sided bracket (tilt bracket) attached to a car body.

A fastening bolt is inserted through a tilt adjustment elongate hole formed in the car body sided bracket and through a telescopic adjustment elongate hole formed in the column sided bracket. A manipulation lever of a clamp mechanism is connected to one side end of this fastening bolt via a cam mechanism and a screw mechanism. With this construction, the fastening bolt is fastened by rotating the manipulation lever in one direction, whereby the two brackets are pressure-contacted to each other and fixedly fastened in a tilt and/or telescopic adjustment position. On the other hand, the fastening bolt is slackened by rotating the manipulation lever in a reverse direction, thereby releasing the two brackets from being pressure-contacted, the tilt and/or telescopic adjustment can be thus performed.

When making the tilt adjustment, the fastening bolt moves substantially in up-and-down directions together with the steering column and the column sided bracket along within the tilt adjustment elongate hole formed in the car body sided bracket.

BY contrast, when making the telescopic adjustment, the steering column and the column sided bracket move substantially in front-and-rear directions of the vehicle along within the telescopic adjustment elongate hole in a way that gets the fastening bolt to engage with the telescopic adjustment elongate hole.

By the way, each of the tilt adjustment elongate hole and the telescopic adjustment elongate hole has a slight gap with respect to the fastening bolt. With this contrivance, the fastening bolt can be smoothly moved along within the two adjustment elongate holes when making the tilt and/or telescopic adjustment, and the tilt and/or telescopic adjustment operation is kept preferable.

Further, when in a tilt and/or telescopic fastening operation, the car body sided bracket and the column sided bracket are pressure-contacted to each other, and hence the backlash does not occur between the two adjustment elongate holes and the fastening bolt even if each of these two adjustment holes has such a slight gap.

When making the tilt and/or telescopic adjustment, especially when in the tilt adjustment, the backlash between the two adjustment elongate holes and the fastening bolt and emission of butting noses, might be caused due to the slight gaps described above on the occasion of the relative movement of the fastening bolt to the two adjustment elongate holes.

DISCLOSURE OF THE INVENTION

It is an object of the present invention, which was devised under the circumstances described above, to provide a steering column apparatus for a vehicle, which is capable of smoothly moving a fastening bolt and preventing emission of butting noises while keeping a tilt and/or telescopic adjustment operation preferable.

To accomplish the above object, according to the present invention, in a tilt and/or telescopic type steering column apparatus for a vehicle, in which a column sided bracket attached to a steering column is so provided as to be swingable and/or slidable on a car body sided bracket attached to a car body, a fastening bolt is inserted through a tilt adjustment elongate hole or round hole formed in the car body sided bracket and through a telescopic adjustment elongate hole or round hole formed in the column sided bracket, the two brackets are pressure-contacted to each other by fastening the fastening bolt and thus subjected to tilt- or telescopic fastening, while a tilt and/or telescopic adjustment can be made by releasing the two brackets from being pressure-contacted by slackening the fastening bolt, and each of the tilt adjustment elongate hole or round hole and the telescopic adjustment elongate hole or round hole has a slight gap with respect to the fastening bolt, the steering column apparatus for the vehicle is characterized in that an annular or cylindrical elastic member for preventing a backlash of the fastening bolt from being caused corresponding to the slight gap when making the tilt and/or telescopic adjustment, is fitted on an outer peripheral surface of the fastening bolt.

Further, in the steering column apparatus for the vehicle according to the present invention, preferably, the annular or cylindrical elastic member can be formed of a synthetic resin.

Still further, in the steering column apparatus for the vehicle according to the present invention, preferably, the column sided bracket has a bottom plate portion in a position that faces the steering column, the annular or cylindrical elastic member can include an annular or cylindrical elastic support portion acting to elastically bias the fastening bolt towards the steering column from the bottom plate portion while abutting on the bottom plate portion and to raise the fastening bolt by at least the gap.

According to the present invention, the annular or cylindrical elastic member for preventing the backlash of the fastening bolt from being caused corresponding to the slight gap when making the tilt or telescopic adjustment, is fitted on the outer peripheral surface of the fastening bolt. Owing to this contrivance, there is neither the occurrence of the backlash between the two adjustment elongate holes or round holes and the fastening bolt due to the slight gap nor the emission of the butting noises on the occasion of a relative movement of the fastening bolt to the two adjustment elongate holes or round holes when making the tilt and/or telescopic adjustment.

Moreover, the fastening bolt can be smoothly moved because of no occurrence of the backlash between the two adjustment elongate holes or round holes and the fastening bolt, and the tilt and/or telescopic adjustment operation can be kept preferable.

EMBODIMENTS OF THE INVENTION

An impact absorbing type and tilt and/or telescopic type steering column apparatus according to embodiments of the present invention, will hereinafter be described with reference to the drawings.

First Embodiment

Figure 1:
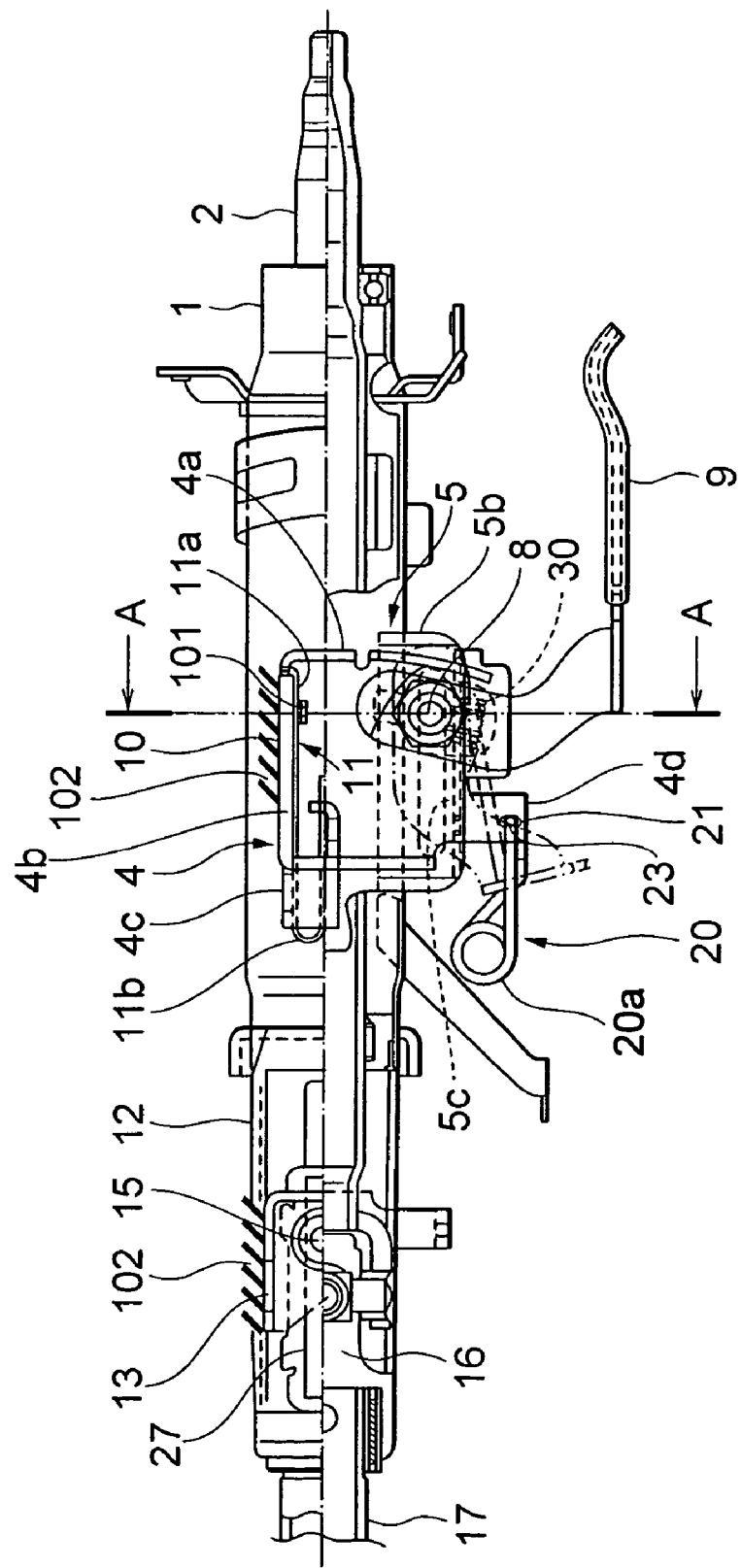
FIG. 1 is a partial sectional side view of an impact absorbing type and tilt and/or telescopic type steering column apparatus according to a first embodiment of the present invention.

FIG. 1 is a side view of the impact absorbing type and tilt and/or telescopic type steering column apparatus according to a first embodiment of the present invention.

Figure 2:
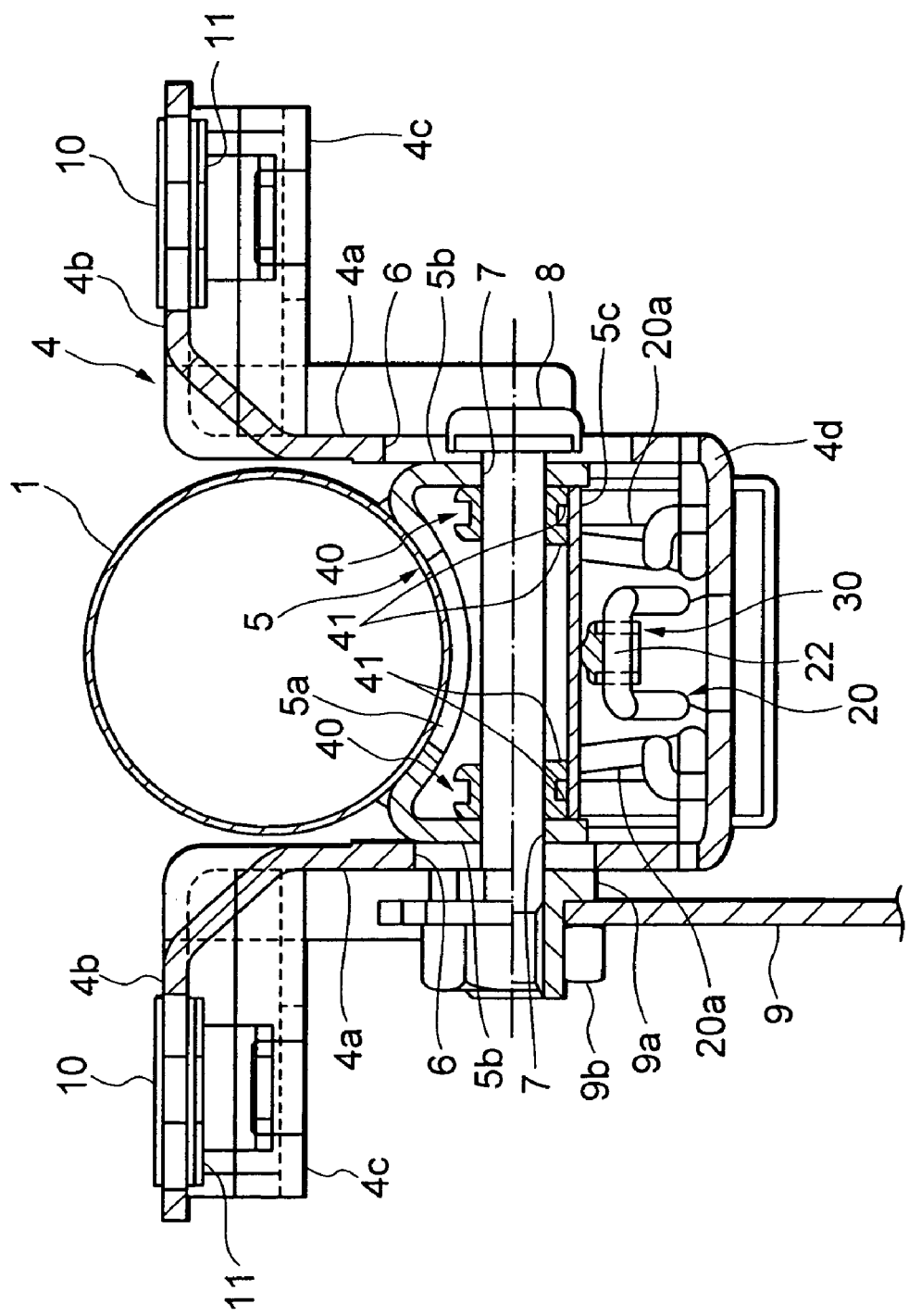
FIG. 2 is a sectional view taken along the line A-A in FIG. 1.

FIG. 2 is a sectional view taken along the line A-A in FIG. 1.

As shown in FIG. 1, a steering shaft 2 is rotatably supported within a steering column 1. A steering wheel (unillustrated) is secured to an upper side end of the steering shaft 2.

The steering column 1 is fixedly supported onto a car body at two portions, i.e., an upper bracket provided on a rear side of the vehicle and a lower bracket provided on a front side thereof.

The upper bracket on the rear side of the vehicle is constructed of a car body sided upper bracket 4 (tilt bracket) fixed to the car body, and of a column sided upper bracket 5 (distance bracket in FIG. 2) fixed to the steering column 1, wherein the two upper brackets 4 and 5 are pressure-contacted to each other.

The car body sided upper bracket 4 includes U-shaped body sided plate portions 4a, 4a extending downward with the steering column 1 interposed therebetween, flange portions 4b, 4b extending crosswise on both sides from the body sided plate portions 4a, 4a and fixed to the car body by use of bolts, overhanging portions 4c, 4c overhanging substantially in a C-shape toward the front of the vehicle from the body sided plate portions 4a, 4a, and a suspended sustaining portion 4d suspended downward at an interval from the body sided plate portions 4a, 4a.

The column sided upper bracket 5 is constructed of, as illustrated in FIG. 2, a column support portion 5a abutting directly on a lower part of the steering column 1 and fixed thereto by welding, etc., bilateral plate portions 5b, 5b integral with the column support portion 5a, extending downward and pressure-contacted by between the body sided plate portions 4a, 4a of the car body sided upper bracket 4, and an insertion plate portion 5c (bottom plate portion) inserted in between lower parts of the bilateral plate portions 5b, 5b.

Each body sided plate portion 4a of the car body sided upper bracket 4 is formed with a tilt adjustment elongate hole 6. Each of the bilateral plate portions 5b, 5b of the column sided upper bracket 5 is formed with a telescopic adjustment elongate hole 7. A fastening bolt 8 is inserted through the tilt adjustment elongate hole 6 and the telescopic adjustment elongate hole 7. A manipulation lever 9 is secured to one side end of the tilt fastening bolt 8 by a fastening nut 9b via an adjustment nut 9a. These components build up a tilt and/or telescopic adjustment clamp mechanism.

Further, coating plates 10 taking substantially a U-shape and impact absorbing plates 11 for absorbing impact energy when a secondary collision happens, are fixed by bolts 101 to a car body sided strengthening member 102, depicted by oblique lines in FIG. 1, at the flanges 4b, 4b of the car body sided upper bracket 4.

The impact absorbing plate 11 is fixed at its proximal side end 11a to the car body by the bolt 11. The impact absorbing plate 11 extends inside the substantially-C-shaped overhanging portion 4c of the car body sided upper bracket 4 toward the front of the vehicle, and, after being bent at a circular-arc portion 11b, extends inside the overhanging portion 4c toward the rear of the vehicle.

Upon the secondary collision, the impact energy acting toward the front of the vehicle gives momentum to the car body sided upper bracket 4, with the result that the upper bracket 4 separates from the coating plates 10 and moves together with the steering column 1 toward the front of the vehicle.

At this moment, the impact absorbing plates 11, the proximal side ends 11a being fixed to the car body by the respective bolts 11, remain on the car body side. On the other hand, the circular-arc portions 11b, etc. each is subjected to a plastic deformation (drawing) within the substantially-C-shaped overhanging portion 4c of the car body sided upper bracket 4 that moves toward the front of the vehicle. The plastic deformation (drawing) of the impact absorbing plate 11 makes it possible to absorb the impact energy of the secondary collision. Those components configure an impact absorption mechanism.

The lower bracket on the front side of the vehicle is constructed of a column sided lower bracket 12 fixed to the steering column 1 and of a car body sided lower bracket 13 pressure-contacted to the lower bracket 12 and fixed to the car body.

The column sided lower bracket 12 is formed with axially elongate holes 27 extending in axial direction. A support pin 15 is inserted through the axially elongate holes 27 formed in the column sided lower bracket 12 and the car body sided lower bracket 13, whereby these lower brackets are fixed to each other by caulking. Further, an intermediate shaft 17 is connected via a universal joint 16 to a vehicle-front-sided portion of the steering shaft 2.

Provided further is a balance spring 20 (or a leap-up spring for leaping up the steering column 1) for sustaining the steering column 1 so as to raise the steering column 1. The balance or leap-up spring 20 is, for example, a coil spring and includes a couple of coil body portions 20a, 20a (FIG. 2), a cut-off ends 21 and a fold-back portion 22 (FIG. 22). The cut-off ends 21 engage with engagement holes 23 formed in the suspended sustaining portion 4d of the car body sided upper bracket 4. The fold-back portion 22 (FIG. 2) is fitted with a slide member 30 formed of a synthetic resin, thereby supporting the column sided upper bracket 5 upward when tilted and/or telescopically moved.

According to the first embodiment, as illustrated in FIG. 2, the tilt adjustment elongate holes 6 and the telescopic adjustment elongate holes 7 each has a slight gap ($\Delta t$ in FIG. 4) with respect to the fastening bolt 8. A pair of annular elastic members 40, 40 for preventing a backlash of the fastening bolt 8 from being caused corresponding to the slight gap ($\Delta t$ in FIG. 4) when making the tilt and/or telescopic adjustment, are fitted on the an outer peripheral surface of the fastening bolt 8.

Each of the annular elastic members 40, 40 is formed of a synthetic rubber. The elastic members 40, 40 have annular elastic support portions 41, 41 acting to elastically bias the fastening bolt 8 toward the steering column 1 from a bottom plate portion 5c of the column sided upper bracket 5 in a way that abuts on this bottom plate portion 5c and to raise the fastening bolt 8 by at least the gap ($\Delta t$ in FIG. 4). Note that the elastic member 40 may be formed of a synthetic resin.

Accordingly, when making the tilt and/or telescopic adjustment, the fastening bolt 8 is relatively movable together with the pair of elastic members 40, 40 along within the two adjustment elongate holes 6, 7. On this occasion, there is neither the backlash between the fastening bolt 8 and the two adjustment elongate holes 6, 7 due to the slight gap (Δt in FIG. 4) nor the emission of butting noises.

Further, the fastening bolt 8 can be smoothly moved because of no occurrence of the backlash between the two adjustment elongate holes 6, 7 and the fastening bolt 8. The tilt and/or telescopic adjustment operation can be maintained preferable.

Still further, the emission of the backlash noises due to (Δt in FIG. 4) when operated for the tilt and/or telescopic adjustment is largely derived from a so-called stick slip, wherein the stick slip is caused at the abutting portion between the components. The stick slip, however, could be obviated, and hence the tilt and/or telescopic adjustment operation can be smoothly performed.

Second Embodiment

Figure 3:
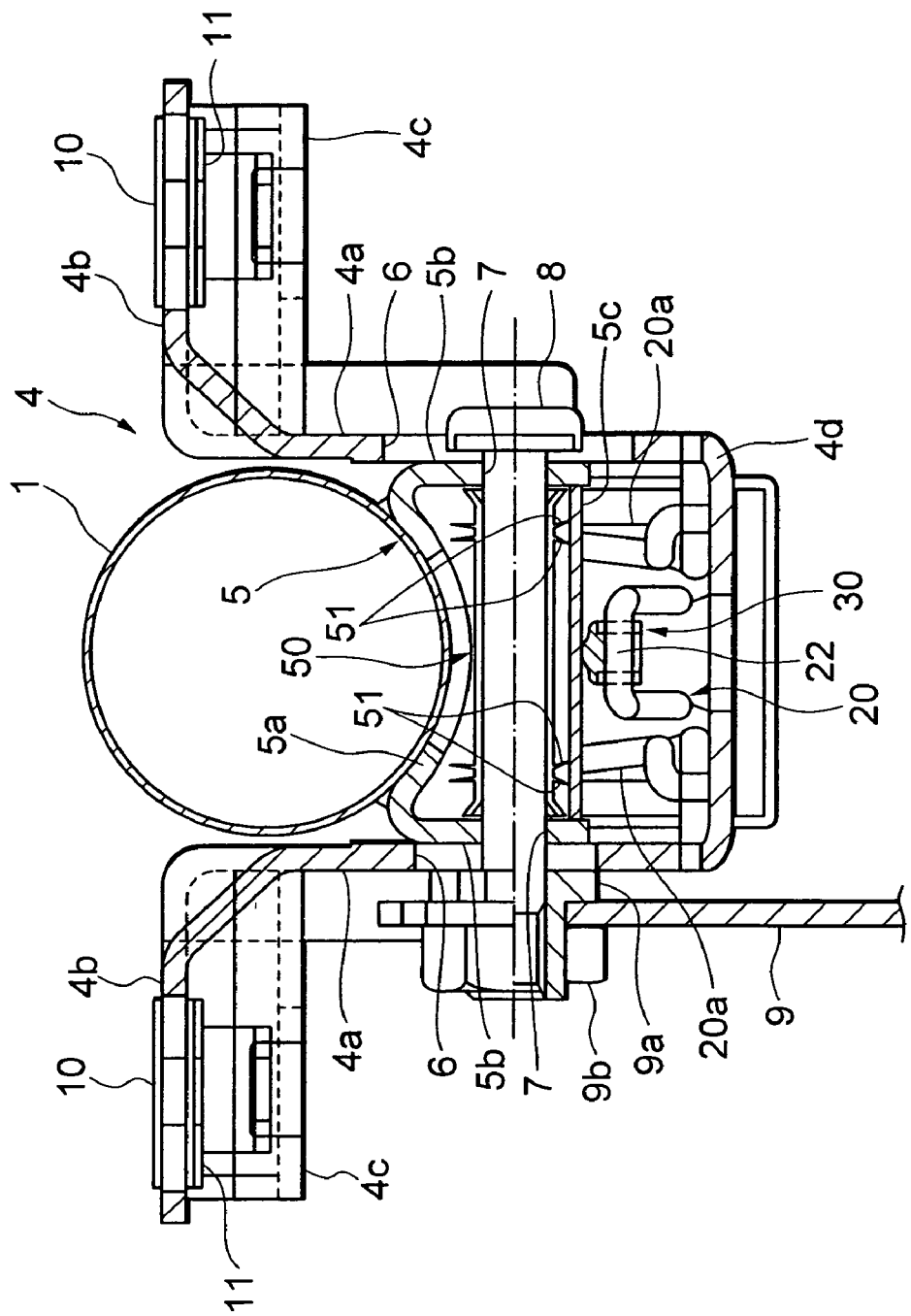
FIG. 3 is a sectional view (corresponding to the sectional view taken along the line A-A in FIG. 1) of the impact absorbing type and tilt and/or telescopic type steering column apparatus according to a second embodiment of the present invention.

FIG. 3 is a sectional view (corresponding to a sectional view taken along the line A-A in FIG. 1) of impact absorbing type and tilt and/or telescopic type steering column apparatus according to a second embodiment of the present invention.

Figure 4:
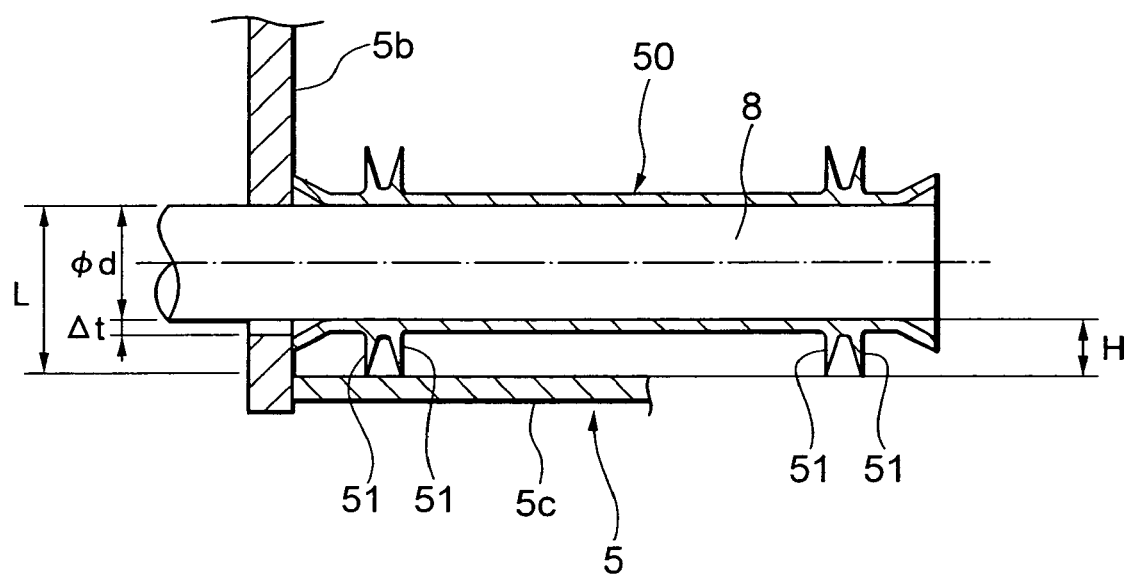
FIG. 4 is an enlarged sectional view of principal portions in FIG. 3.

FIG. 4 is an enlarged sectional view of the principal portions in FIG. 3.

According to the second embodiment, a cylindrical elastic member 50 for preventing the backlash of the fastening bolt 8 from being caused corresponding to the slight gap (Δt) when making the tilt and/or telescopic adjustment, is fitted on the outer peripheral surface of the fastening bolt 8. The cylindrical elastic member 50, which is defined as a dedicated component, is given a more improved assembling property than in the first embodiment involving the use of the pair of elastic members 40, 40. Further, the cylindrical elastic member 50 is formed of a soft synthetic resin or rubber.

The cylindrical elastic member 50 has a plurality of elastic support portions 51, 51 in the vicinities of bilateral end portions thereof. The elastic support portions 51, 51 act to elastically bias the fastening bolt 8 toward the steering column 1 from the bottom plate portion 5c in a way that abuts on this bottom plate portion 5c and to raise the fastening bolt 8 by at least the gap (Δt in FIG. 4).

Moreover, as shown in FIG. 4, each elastic support portion 51 is annular and pointed at an acute angle. Further, a height dimension (H) of each elastic support portion 51 is set equal to or larger than a value obtained by subtracting an outside diameter (φd) of the fastening bolt 8 from a distance (L) from an upper side of the telescopic adjustment elongate hole 7 down to the bottom plate portion. This setting enables each of the elastic support portions 51, 51 to raise the fastening bolt 8 by at least the gap (Δt). Note that a dimension of the gap (Δt) is depicted in exaggeration for clarity in FIG. 4.

Accordingly, when making the tilt and/or telescopic adjustment, the fastening bolt 8 is relatively movable together with the cylindrical elastic member 50 along within the two adjustment elongate holes 6, 7. On this occasion, there is neither the backlash between the fastening bolt 8 and the two adjustment elongate holes 6, 7 due to the slight gap (Δt) nor the emission of butting noises. Further, the fastening bolt 8 can be smoothly moved because of no occurrence of the backlash between the two adjustment elongate holes 6, 7 and the fastening bolt 8. The tilt and/or telescopic adjustment operation can be maintained preferable. Moreover, when making the telescopic adjustment, the cylindrical elastic member 50 may be moved while rotating about the fastening bolt 8. Other configurations and effects are the same as those in the embodiment discussed above.

Note that the present invention is not limited to the embodiments discussed above and can be modified in a variety of forms. The discussions on the embodiments described above have dealt with the tilt and/or telescopic type steering column, however, a tilt type steering column may also be available. In this case, the car body sided bracket is formed with a tilt adjustment elongate hole, while the column sided bracket is formed with a round hole. Moreover, a telescopic steering column may also be available. In this case, the car body sided bracket is formed with a round hole, while the column sided bracket is formed with a telescopic adjustment elongate hole.

As discussed above, according to the present invention, the annular elastic members or the cylindrical elastic member for preventing the backlash of the fastening bolt 8 from being caused corresponding to the slight gap when making the tilt and/or telescopic adjustment, is fitted on the outer peripheral surface of the fastening bolt. This construction prevents the backlash between the fastening bolt and the tilt and/or telescopic adjustment holes due to the slight gap and the emission of butting noises on the occasion of the relative movement of the fastening bolt when making the tilt and/or telescopic adjustment.

Further, the fastening bolt can be smoothly moved because of no occurrence of the backlash between the tilt and/or telescopic adjustment holes and the fastening bolt. The tilt and/or telescopic adjustment operation can be maintained preferable.

What is claimed is:

1. In a tilt and/or telescopic steering column apparatus for a vehicle, in which a column side bracket attached to a steering column is so provided as to be swingable and/or slidable on a vehicle body side bracket attached to a vehicle body, a fastening bolt is inserted through a tilt adjustment hole formed in said vehicle body side bracket and through a telescopic adjustment hole formed in said column sided bracket, said two brackets are fastened to each other with pressure by fastening said fastening bolt and thus fastened in a tilt and/or telescopic adjustment position, while a tilt and/or telescopic adjustment can be made by releasing said two brackets from each other by loosening said fastening bolt, and said telescopic adjustment hole has a slight gap with respect to said fastening bolt, the steering column apparatus for the vehicle being characterized in that said column side bracket has a bottom plate portion in a position that faces said steering column;

an annular elastic member for preventing a backlash of said fastening bolt due to the slight gap when making the tilt and/or telescopic adjustment is fitted on an outer peripheral surface of said fastening bolt; and said annular elastic member includes an annular elastic support portion acting to elastically bias said fastening bolt towards said steering column from said bottom plate portion while abutting on said bottom plate portion and to raise said fastening bolt by at least said gap.

2. A steering column apparatus for a vehicle according to claim 1, wherein said annular elastic member is formed of a synthetic resin.

3. In a tilt steering column apparatus for a vehicle, in which a column side bracket attached to a steering column is so provided as to be swingable on a vehicle body side bracket attached to a vehicle body, a fastening bolt is inserted through a tilt adjustment hole formed in said vehicle body side bracket and through a hole formed in said column side bracket, said two brackets are fastened to each other with pressure by fastening said fastening bolt and thus fastened in a tilt adjustment position, while a tilt adjustment can be made by releasing said two brackets from each other by loosening said fastening bolt, and said hole formed in said column side bracket has a slight gap with respect to said fastening bolt, the steering column apparatus for the vehicle being characterized in that said column side bracket has a bottom plate portion in a position that faces said steering column;

an annular or cylindrical elastic member for preventing a backlash of said fastening bolt due to the gap when making the tilt adjustment is fitted on an outer peripheral surface of said fastening bolt; and said annular elastic member includes an annular elastic support portion acting to elastically bias said fastening bolt towards said steering column from said bottom plate portion while abutting on said bottom plate portion and to raise said fastening bolt by at least said gap.

4. In a telescopic steering column apparatus for a vehicle, in which a column side bracket attached to a steering column is so provided as to be slidable on a vehicle body side bracket attached to a vehicle body, a fastening bolt is inserted through a hole formed in said vehicle body side bracket and through a telescopic hole formed in said column side bracket, said two brackets are fastened to each other with pressure by fastening said fastening bolt and thus fastened in a telescopic adjustment position, while a telescopic adjustment can be made by releasing said two brackets from each other by loosening said fastening bolt, and said telescopic adjustment hole formed in said column side bracket has a slight gap with respect to said fastening bolt, the steering column apparatus for the vehicle being characterized in that said column side bracket has a bottom plate portion in a position that faces said steering column;

an annular elastic member for preventing a backlash of said fastening bolt due to the gap when making the telescopic adjustment is fitted on an outer peripheral surface of said fastening bolt; and said annular elastic member includes an annular elastic support acting to elastically bias said fastening bolt towards said steering column from said bottom plate portion while abutting on said bottom plate portion and to raise said fastening bolt by at least said gap.

5. In a tilt and/or telescopic steering column apparatus for a vehicle, in which a column side bracket attached to a steering column is so provided as to be swingable and/or slidable on a vehicle body side bracket attached to a vehicle body, a fastening bolt is inserted through a hole formed in said vehicle body side bracket and through a hole formed in said column side bracket, said two brackets are fastened to each other with pressure by fastening said fastening bolt and thus fastened in a tilt and/or telescopic adjustment position, while a tilt and/or telescopic adjustment can be made by releasing said two brackets from each other by loosening said fastening bolt, and said hole formed in said column side bracket has a slight gap with respect to said fastening bolt, the steering column apparatus for the vehicle being characterized in that said column side bracket has a bottom plate portion in a position that faces said steering column;

an annular elastic member for biasing said fastening bolt against the hole formed in the column side bracket is fitted on an outer peripheral surface of said fastening bolt; and said annular elastic member includes an annular elastic support portion acting to elastically bias said fastening bolt towards said steering column from said bottom plate portion while abutting on said bottom plate portion and to raise said fastening bolt by at least said gap.

* * * * *